Oct. 18, 1966  J. P. EBERZ  3,279,202
CONCENTRATION CONTROL FOR ABSORPTION REFRIGERATION SYSTEMS
Filed April 9, 1965
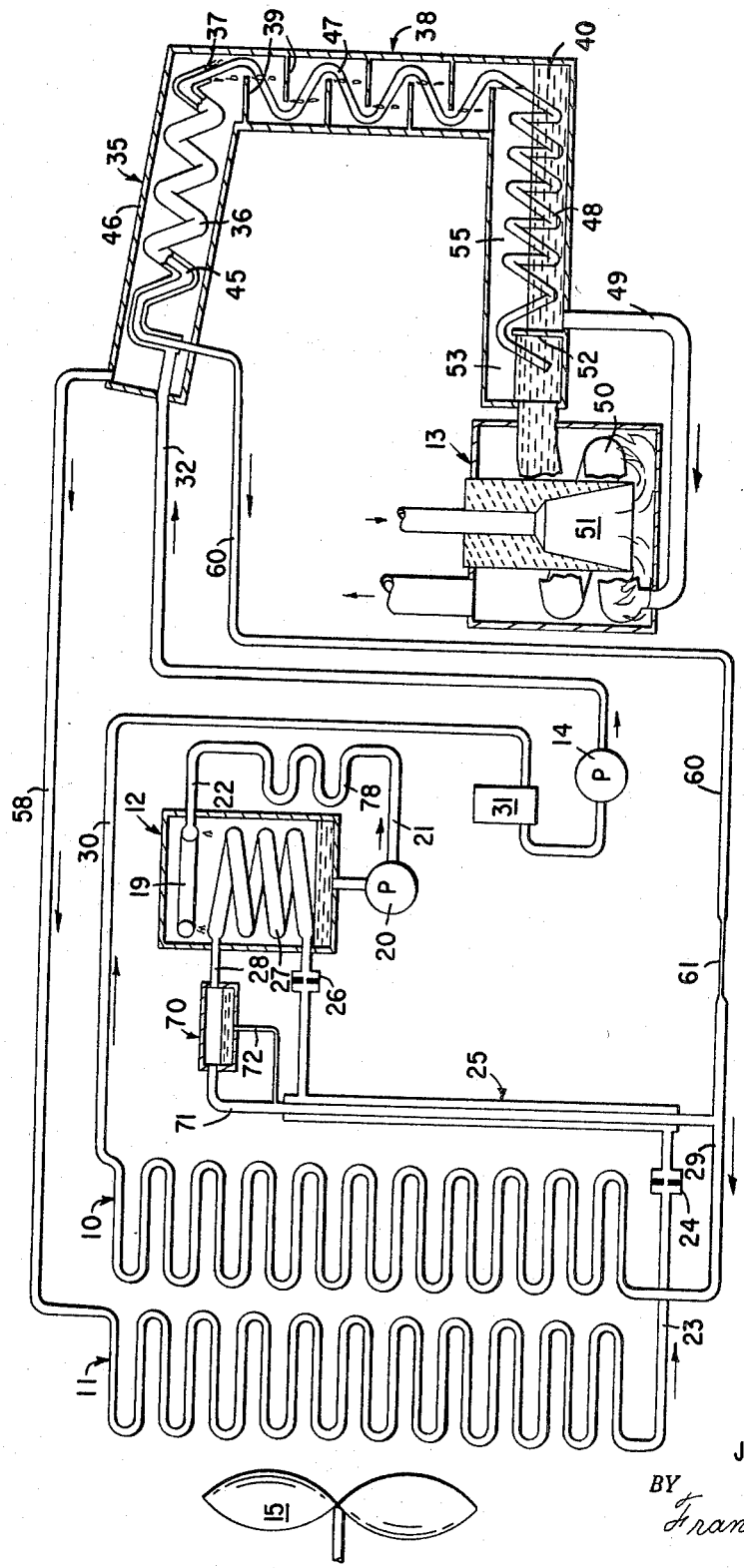
INVENTOR.
JOHN P. EBERZ.
BY
Frank N. Decker Jr.
ATTORNEY.

United States Patent Office

3,279,202
Patented Oct. 18, 1966

3,279,202
CONCENTRATION CONTROL FOR ABSORPTION
REFRIGERATION SYSTEMS
John P. Eberz, Syracuse, N.Y., assignor to Carrier Corporation, Syracuse, N.Y., a corporation of Delaware
Filed Apr. 9, 1965, Ser. No. 446,985
7 Claims. (Cl. 62—101)

This invention relates to absorption refrigeration, and more particularly to absorption refrigeration systems which may be called to operate under various conditions.

Absorption refrigeration systems are customarily rated at a predetermined set of uniform conditions which include a desired chilled water temperature, a desired capacity, and a specific ambient air temperature for cooling absorber and condenser coils. These operating conditions are referred to as "design conditions."

Heat transfer surfaces in the various components of a particular machine can be optimized to provide a design capable of operating efficiently at these design conditions. Also, the charge of refrigerant and absorbent in any particular machine can be adjusted to give optimum performance of the unit at the design conditions. In general, the optimum charge is one which balances absorber and evaporator capacity at the design condition in such a way that the unit will operate at the highest absorber and evaporator capacity at the design conditions in such a way the refrigerant and produce the required capacity. In practice, the charge is set for the design conditions with possibly a small safety factor to cover factory tolerances in charge and design. In absorption refrigeration systems of the type using ammonia as a refrigerant and water as an absorbent, some absorbent will enter the evaporator due to incomplete separation of absorbent and refrigerant. In such systems there will always be a slight overflow or "residue" from the evaporator of liquid absorbent which is saturated with dissolved refrigerant when operating at design conditions.

Design conditions are seldom actually encountered during operation of an absorption refrigeration machine. Unfortunately, a machine which has a solution charge which is properly adjusted to provide maximum capacity at design conditions does not normally provide optimum performance at off design conditions.

If the temperature of the ambient air flowing through the condenser and absorber coils increases above design conditions, the evaporator pressure and refrigerant temperature also increases. This reduces the mean temperature difference between the refrigerant and water being chilled. The smaller temperature difference results in a decrease in the capacity of the evaporator to evaporate refrigerant and the weight of refrigerant in residue from the evaporator is increased. The result is that the machine can no longer produce its rated capacity because less heat is transferred from the water being chilled to the evaporator.

Likewise, if the temperature of the chilled water entering the unit is lowered, such as by a decrease in refrigeration load, the mean temperature difference between the refrigerant and the water being chilled is decreased. The decreased temperature difference results in less heat being transferred from the water being chilled, and the capacity of the machine is correspondingly decreased.

On the other hand, if the above conditions are reversed, such that air temperature is decreased below design conditions or the temperature of chilled water entering the evaporator is increased above design conditions, the temperature difference between refrigerant and the water being chilled will increase. Although the potential evaporator capacity is thereby increased, little actual increase in capacity is possible because there is virtually no additional refrigerant available for evaporation above the design condition of refrigerant flow. Under these conditions there is too little refrigerant flowing in the system for optimum performance. However, an increase in refrigerant charge above optimum charge at design conditions, would raise the efficiency of the machine, for a given heat input, by lowering the generator boiling point to make the machine provide greater capacity.

It will be seen that the capacity of the system at off design conditions can be improved by adding or removing refrigerant from the system. It is also apparent that when the amount of residue is above the minimum design residue, refrigerant should be removed from the system, and when the residue is low, it is advantageous to add refrigerant to the system.

Accordingly, it is a principal object of this invention to provide an improved absorption refrigeration system which is capable of efficient operation at off design conditions as well as at design conditions.

It is a further object of this invention to provide means for automatically adjusting the quantity of refrigerant circulating in an absorption refrigeration system to compensate for various operating conditions.

These and other objects are achieved in the illustrated embodiment of this invention by providing a refrigerant concentration control reservoir in the passage connecting the evaporator with the absorber. The refrigerant vapor and residue are discharged from the evaporator coil into the reservoir. A vapor passage is provided for passing the refrigerant vapor from the reservoir to the absorber. A liquid passage is provided for passing a predetermined quantity of residue liquid from the reservoir into the vapor passage. The liquid passage is relatively restricted with respect to the vapor passage and is designed so as to pass substantially the same amount of liquid residue as the amount of residue passing into the reservoir from the evaporator at rated design conditions. The refrigeration system is charged with sufficient refrigerant so that the reservoir operates in a partially filled condition at design conditions.

When the refrigeration system is operating at design conditions, the amount of liquid residue discharged into the reservoir will substantially balance the amount of liquid bled out of the reservoir into the vapor passage through the liquid passage. In the event that the chilled water temperature drops or the ambient air temperature rises, causing less refrigerant to be evaporated, excess residue, which includes a substantial quantity of refrigerant, will accumulate in the reservoir. The accumulated refrigerant is effectively withdrawn from circulation from the refrigeration system. Refrigerant will continue to accumulate in the reservoir until sufficient refrigerant is withdrawn from circulation to lower the absorber and evaporator pressures so that the evaporator evaporates more refrigerant. The withdrawal of refrigerant from circulation in the system results in a lower refrigerant temperature inside the evaporator coil, thus maintaining the temperature difference across the coil necessary to provide substantially the design capacity at off design ambient temperatures.

On the other hand, should the chilled water temperature rise, as in the case of an increased load, or the ambient temperature drop, the quantity of residue will decrease and refrigerant will pass out of the reservoir through the liquid passage and into the absorber until sufficient refrigerant has been added to that circulating in the system to obtain maximum efficiency at the increased load. The increased efficiency will result in providing some additional capacity.

These as well as other objects of this invention will become more readily apparent by referring to the following specification and attached drawing wherein the figure is a schematic diagram of an absorption refrigeration system employing a refrigerant concentration control reservoir in accordance with this invention.

Referring particularly to the drawing, there is shown an absorption refrigeration system having an absorber 10, a condenser 11, an evaporator 12, and a generator 13 connected to provide refrigeration. A pump 14 is employed to circulate weak absorbent solution from absorber 10 to generator 13. As used herein, the term "weak absorbent solution" refers to a solution which is weak in absorbing power, and the term "strong absorbent solution" refers to a solution which is strong in absorbing power. A suitable absorbent solution for use in the system described is water, and a suitable refrigerant is ammonia. For convenience, the absorbent liquid will be referred ot as an "absorbent solution" although it will be appreciated that pure water is not technically a solution.

A chilled water pump 20 is provided for forwarding water, or other heat exchange medium chilled in evaporator 12, through chilled water line 21 to heat exchanger 78 in a suitable remote location for chilling a refrigeration load. The water is then return from heat exchanger 78 through chilled water line 22 to a spray header 19 from which it is again distributed over the exterior of evaporator coil 27.

Liquid refrigerant is passed from condenser 11 through liquid line 23, refrigerant restriction 24, the exterior passage of liquid suction heat exchanger 25 and second refrigerant restriction 26, to evaporator coil 27 of evaporator 12. Heat from the water to be chilled, passing over the exterior of evaporator coil 27, is given up to the refrigerant which vaporizes in the interior passage of the evaporator coil. The refrigerant vapor passes from coil 27 through vapor line 28, refrigerant reservoir 70, vapor line 71, and the interior passage of liquid suction heat exchanger 25, to mixing line 29 where it is mixed with strong solution returning to the absorber from the generator.

The mixture of refrigerant vapor and strong solution passes through mixing line 29 into the heat exchange coil which forms absorber 10. Air is passed over the exterior of the absorber coil by fan 15 to cool absorbent solution therein and increase its absorbing power. The absorbent solution is weakened as it absorbs refrigerant vapor during its passage through the absorber. By the time the absorbent solution reaches the discharge end of the absorber coil, the refrigerant vapor is completely absorbed in the absorbent solution and the solution has become weak in absorbing power by the absorption of the vapor.

The weak absorbent solution passes through weak solution line 30 to a purge tank 31 where noncondensible gases are collected and withdrawn from the system. The weak solution is then forwarded by solution pump 14 through weak solution line 32 to combined rectifier and heat exchanger section 35.

Rectifier and heat exchanger section 35 comprises an outer shell 46 forming a vapor passage. Shell 46 contains an inner heat exchange coil 45 and a concentric outer heat exchange coil 36, as shown in the drawing. Preferably, outer heat exchange coil 36 is spirally disposed along the inner wall of shell 46 and it may be provided with suitable fins for enhancing heat transfer.

Coils 36 and 45 form a solution heat exchanger between the entire quantity of relatively hot strong solution passing from the generator to the absorber and the entire quantity of relatively cool weak solution passing from the absorber to the generator. The amount of heat transfer surface provided between the strong and weak solution is designed so that the weak solution is brought to just about its boiling point so that vapor is not formed in the solution heat exchanger.

The weak solution from line 32 passes through coil 36 in the annular space between inner heat exchange coil 45 and outer heat exchange coil 36 where the weak solution is heated to substantially its boiling point by heat exchange with strong solution. After passing through coil 36, the heated weak solution is discharged from opening 37 onto one of a plurality of baffles or plates 39 in analyzer column 38.

Analyzer 38 comprises a tubular member having a plurality of plates 39 which provide surfaces for contact of vapor with the reflux and the solution which wets the surfaces of the plates. The weak solution passes successively over the plurality of plates and is discharged from the bottom of the analyzer into a generator reservoir 40. Generator reservoir 40 provides solution storage for part load operation conditions and allows for solution and refrigerant charging tolerance, and compensates for manufacturing variations in machine volume.

Weak solution from the generator reservoir 40 passes through line 49 into generator coil 50. The solution in coil 50 is heated by suitable means such as gas burner 51 causing the solution to boil thereby forming vapor. The vapor and hot solution is discharged from coil 50 into separation chamber 53, formed by a baffle or weir 52, where the vapor separates from the remaining strong solution. Preferably, some of the solution normally spills over the top of baffle 52 and is recirculated through line 49 to generator coil 50. It will be understood that the solution in separation chamber 53 has been concentrated by vaporizing refrigerant therefrom in generator 13.

Vapor formed in generator 13 passes concurrently with strong solution through the vapor passage 55 formed in the upper portion of generator reservoir 40, through analyzer 38, and through the vapor passage formed by shell 46 of rectifier 35 to condenser 11.

The concentrated or strong absorbent solution from separation region 53 is at the relatively high generator pressure and passes through heat exchange coil 48 in generator reservoir 40, heat exchange coil 47 in the analyzer column, and inner heat exchange coil 45 in the rectifier. The strong solution then passes through line 60 and restriction 61 into line 29 and absorber 10 on the relatively low pressure side of the system.

Heat from the strong solution passing through coil 48 boils the weak solution in the generator reservoir to vaporize refrigerant therefrom. The heat exchange which takes place in the generator reservoir results in cooling the strong solution flowing through coil 48 so that it enters the analyzer and rectifier respectively at the best temperature to achieve maximum efficiency with minimum heat transfer surface.

A portion of coil 48 is submerged below the level of weak solution in reservoir 40 and another portion of the coil is disposed in the vapor passage above the weak solution. The boiling of the weak solution causes the portion of coil 48 which is disposed in vapor passage 55 to be wetted with solution. As the strong solution passes through coil 48, it becomes progressively cooler. Vapor formed in the generator and in the reservoir passes through the vapor passage 55 and contacts the exposed wetted portion of coil 48 in reservoir 40, and mass and heat transfer take place with the weak solution boiling in the reservoir. It will be appreciated that ammonia vapor will be boiled from the weak solution in the reservoir and that water vapor will be condensed from the vapor space into the weak solution in proportions resulting in an enrichment of the refrigerant content of the vapor passing through the reservoir. Also, the condensation of water vapor into the weak solution will liberate additional heat which assists in vaporizing the solution.

Similarly, as the vapor passes from the reservoir upwardly through analyzer column 38, a mass and heat transfer takes place between the weak solution passing downwardly over plates 39 in the column and further enriches the refrigerant content of the vapor.

The vapor then passes through rectifier 35 where it is placed in heat exchange relation with the weak solution passing through coil 36. The heat transfer which takes place in the rectifier results in condensing additional water from the vapor which then leaves the rectifier in a highly purified or enriched state.

The purified refrigerant vapor passes from rectifier 35 through line 58 into the coil of condenser 11. Fan 15 passes air over condenser 11 causing the refrigerant vapor to condense. The condensed refrigerant passes through line 23 and restriction 24 into evaporator 12, as previously explained.

As the vapor passes through rectifier 35, the reflux or solution which is condensed flows by gravity to analyzer 38 and passes downwardly through the analyzer column along with weak solution discharged from outlet 37 of coil 36. This rectifier condensate is heated along with weak solution in the analyzer to produce additional vapor by heat exchange with strong solution passing through coil 47.

In accordance with this invention, a refrigerant concentration control reservoir 70 is provided in the line between the discharge of evaporator coil 27 and the entrance to absorber 10. Preferably, reservoir 70 is located ahead of the interior returning vapor passage of a liquid suction heat exchanger 25, as shown in the drawing. Line 28 comprises a relatively unrestricted passage for admitting refrigerant vapor and liquid residue discharge from evaporator coil 27 into the interior of reservoir 70. A relatively unrestricted vapor passage 71 connects the upper region of reservoir 70 to the interior passage of heat exchanger 25, for passing refrigerant vapor from the evaporator through the heat exchanger to the absorber.

A relatively restricted liquid passage 72 extends from adjacent the lower region of reservoir 70 to a point in vapor line 71 below the bottom of reservoir 70. The discharge end of relatively restricted liquid line 72 is preferably located sufficiently below the level of reservoir 70 so that variations in the level of liquid therein do not greatly affect the quantity of liquid passed through line 72, and line 72 can be said to pass a substantially constant quantity of liquid therethrough.

Since ammonia and water are not completely separated from each other in rectifier 35, some water will pass from condenser 11 into evaporator coil 27 and be discharged therefrom. The water contains a substantial amount of ammonia dissolved therein. The liquid being discharged from evaporator coil 27 is largely refrigerant and will be referred to as "residue." The liquid residue of evaporator coil 27 passes through line 28 into refrigerant reservoir 70 along with the evaporated refrigerant vapor. Preferably, liquid line 72 is of a size to pass a quantity of liquid residue which is substantially the same as the quantity of residue discharged from the evaporator coil at the so-called design conditions. Under conditions of relatively low chilled water temperature or high ambient air temperature the quantity of residue is increased by the addition of unevaporated refrigerant and exceeds the capacity of line 72 so that refrigerant will accumulate in the vessel. Under conditions of relatively high chilled water temperature or low ambient air temperature the quantity of residue will decrease below the capacity of line 72 so that refrigerant will pass from the reservoir into the vapor line to the absorber.

The refrigeration system preferably charged with an amount of refrigerant and absorbent so that refrigerant reservoir 70 operates about half full at design conditions. Under these conditions, the amount of residue passing from evaporator coil 27 into the reservoir is substantially balanced by the amount of residue bled through line 72 from the reservoir into vapor line 71, and the level of residue in vessel 70 remains substantially constant.

In the event that a lower refrigeration load is imposed on the system at external heat exchanger 78, the lessened refrigeration load will be reflected by a drop in entering chilled water temperature in line 22. The drop in entering chilled water temperature will in turn result in a lower difference in temperature between the chilled water passing over the exterior of evaporator coil 27 and the temperature of the refrigerant evaporating in the interior of the coil. This lessened temperature difference will result in less heat being transferred from the chilled water to the refrigerant in the evaporator coil, and consequently less refrigerant will be evaporated. Since less refrigerant is evaporated, the quantity of residue from the evaporator coil will increase and residue will be discharged into reservoir 70 at a rate greater than it is bled from the reservoir through line 72. Consequently, the level of residue in reservoir 70 will rise. While it will be appreciated that there is a substantial quantity of absorbent in the residue, it will be also understood that the residue is largely unevaporated refrigerant liquid and therefore a substantial quantity of refrigerant will accumulate in reservoir 70. This refrigerant is effectively withdrawn from circulation in the absorption machine.

Refrigerant will continue to accumulate in reservoir 70 until the temperature and pressure in evaporator 27 drops sufficiently so that sufficient heat is transferred through evaporator coil 27 to evaporate most of the refrigerant passing therethrough and produce only the amount of residue which can be bled from reservoir 70 by line 72. In other words, refrigerant will continue to be withdrawn from circulation and accumulate in reservoir 70 until the difference in temperature between the entering chilled water passing over coil 27 and the temperature of the refrigerant evaporating in coil 27 increases sufficiently to evaporate enough refrigerant to produce only the amount of residue which can pass through line 72. This will occur when the temperature difference between entering chilled water and evaporating temperature is substantially restored to that which occurs at design operating conditions. Under these conditions, full design heat transfer can take place across the evaporator coil and the machine is capable of operating at full capacity.

A similar effect will take place in the event that the ambient temperature rises, thus raising the temperature of the absorber and condenser coils. This would normally produce a rising refrigerant temperature because of a rise in absorber pressure and would result in a loss in capacity due to the resulting decrease in temperature across the evaporator coil. However, because of refrigerant reservoir 70, refrigerant will accumulate in the reservoir until the capacity has been restored by decreasing the evaporator pressure to increase the temperature difference across the evaporator coil.

On the other hand, if the refrigeration machine operating at design conditions and the entering chilled water temperature rises, reflecting a higher refrigeration load imposed on heat exchanger 78, or the ambient temperature drops, the temperature difference between the entering chilled water and the refrigerant evaporating in evaporator coil 27 will tend to rise. At this point the evaporator coil is capable of providing increased refrigeration capacity, and the system of this invention automatically permits an increase in refrigeration capacity. Under these conditions, the residue from evaporator coil 27 will be reduced below the amount of residue at the design conditions. Since line 72 is capable of bleeding more residue into vapor line 71 than is passing into reservoir 70 through line 28, it will be apparent that the level of residue in the reservoir will drop. Consequently, residue containing a large quantity of refrigerant is added to the fluid circulating in the refrigeration system. The additional refrigerant will lower the boiling point of weak solution in the generator, which in turn will decrease the temperature difference between the high and low sides of the refrigeration system, and will result in increased efficiency. The increased efficiency will provide increased refrigeration capacity to take care of an additional refrigeration load imposed on the system.

It will be seen that by the practice of this invention means is provided to automatically compensate for deviations in ambient temperatures and refrigeration load from those existing at the design conditions. By this system, it is possible to provide substantially full capacity, not only at design conditions, but also at higher ambient temperatures and lower entering chilled water temperatures. It is also possible to provide increased capacity when the entering chilled water temperature rises or when the ambient temperature drops.

Furthermore, the concentration control reservoir of this invention provides a convenient means of providing a factory refrigerant charging tolerance, since the concentration of refrigerant is automatically adjusted by the self-balancing effect of the level of residue remaining in the reservoir.

Because refrigeration systems of the type described frequently do not vary the heat input to the system, the concentration control described provides a means for varying the refrigerant concentration to compensate for off design operating conditions. It will be appreciated that a refrigeration system operates at off design conditions more often than at design conditions, and the self-regulating feature of an absorption refrigeration machine in accordance with this invention is a substantial advantage because it permits the machine to provide satisfactorily high capacity over a wide variety of operating conditions.

While a preferred embodiment of this invention has been described for purposes of illustration, it will be appreciated that this invention may otherwise be embodied within the scope of the following claims.

I claim:
1. An absorption refrigeration system comprising:
   (A) an absorber for absorbing refrigerant vapor;
   (B) an evaporator for evaporating refrigerant and providing a cooling effect;
   (C) a generator for concentrating weak absorbent solution by vaporizing refrigerant therefrom;
   (D) a condenser for condensing refrigerant vaporized in said generator;
   (E) reservoir means disposed in communication with a line extending between said evaporator and said absorber for collecting liquid residue discharged from said evaporator prior to said residue entering said absorber; and
   (F) means for constantly passing a substantially fixed quantity of liquid residue from said reservoir to other portions of said refrigeration system for circulation therein, during operation of said system so as to automatically adjust the quantity of refrigerant circulating in said system by change in the quantity of refrigerant stored in said reservoir in accordance with the difference between said fixed quantity discharged from said reservoir and the quantity of residue discharged from said evaporator, to provide efficient operation thereof.

2. An absorption refrigeration system comprising:
   (A) an absorber for absorbing refrigerant vapor;
   (B) an evaporator for evaporating refrigerant and providing a cooling effect;
   (C) a generator for concentrating weak absorbent solution by vaporizing refrigerant therefrom;
   (D) a condenser for condensing refrigerant vaporized in said generator; and
   (E) a concentration control comprising a refrigerant storage reservoir disposed in a line connecting the outlet of said evaporator with the inlet of said absorber, said refrigerant reservoir comprising:
      (1) a tank member adapted to store liquid,
      (2) passage means connecting the outlet of said evaporator to said tank member to discharge fluid leaving said evaporator into said tank member,
      (3) vapor passage means for passing vapor from said tank member to the inlet of said absorber, and
      (4) restricted liquid passage means for passing a predetermined quantity of liquid from said tank to the inlet of said absorber.

3. An absorption refrigeration system comprising:
   (A) An absorber for absorbing refrigerant vapor;
   (B) an evaporator for evaporating refrigerant and providing a cooling effect;
   (C) a generator for concentrating weak absorbent solution by vaporizing refrigerant therefrom;
   (D) a condenser for condensing refrigerant vaporized in said generator; and
   (E) a concentration control comprising a refrigerant storage reservoir disposed in a line connecting the outlet of said evaporator with the inlet of said absorber, said refrigerant reservoir comprising:
      (1) a tank member adapted to store liquid,
      (2) passage means connecting the outlet of said evaporator to said tank to discharge fluid leaving said evaporator into said tank member,
      (3) vapor passage means for passing vapor from said tank member to the inlet of said absorber, and
      (4) liquid passage means for passing liquid from said tank member to said absorber, said liquid passage means being designed to pass substantially only the quantity of liquid residue discharged from said evaporator into said tank member under a predetermined operating condition of said system.

4. An absorption refrigeration system comprising:
   (A) an absorber for absorbing refrigerant vapor;
   (B) an evaporator for evaporating refrigerant and providing a cooling effect;
   (C) a generator for concentrating weak absorbent solution by vaporizing refrigerant therefrom;
   (D) a condenser for condensing refrigerant vaporized in said generator; and
   (E) a refrigerant storage concentration control reservoir disposed in a line extending between the outlet of said evaporator and the inlet of said absorber, said reservoir including:
      (1) inlet means to discharge vapor and residue from said evaporator into said reservoir,
      (2) outlet means adjacent an upper portion of said reservoir for passing vapor from said reservoir to said absorber,
      (3) bleed conduit means for discharging liquid from said reservoir to said absorber, said bleed conduit being of a size to pass substantially the volume residue from said evaporator under design operating conditions, and
      (4) said system being charged with refrigerant and absorbent solution so that said reservoir is partially filled with refrigerant at design conditions of said system so that the quantity of refrigerant circulating in said system is varied under off-design conditions of operation of said system by changes in the quantity of refrigerant stored in said reservoir.

5. An absorption refrigeration system comprising:
   (A) an absorber for absorbing refrigerant vapor;
   (B) an evaporator for evaporating refrigerant and providing a cooling effect;
   (C) a generator for concentrating weak absorbent solution by vaporizing refrigerant therefrom;
   (D) a condenser for condensing refrigerant vaporized in said generator; and
   (E) a concentration control comprising a refrigerant storage reservoir disposed in a line connecting the outlet of said evaporator with the inlet of said absorber, said refrigerant reservoir comprising:
      (1) a tank member,
      (2) passage means connecting the outlet of said evaporator to said tank to discharge the fluid leaving said evaporator into said tank, (3) vapor passage means for passing vapor from said tank to said absorber, (4) restricted liquid passage means for passing liquid from said tank to said absorber, said liquid passage presenting a substantially constant restriction to the flow of liquid from said tank to said absorber and being of a size to pass substantially only the amount of residue discharged from said evaporator under a predetermined design operating condition of said system, said liquid passage means comprising a restricted tube extending from said tank to said vapor passage means at a location substantially below the bottom of said tank member so as to provide a relatively constant flow of liquid through said passage at various levels of solution in said tank.

6. In a method of operating an absorption refrigeration system having an absorber, an evaporator, a generator, a condenser, the steps comprising:

(A) evaporating refrigerant in said evaporator to provide cooling;

(B) absorbing refrigerant vapor formed in said evaporator in absorbent solution in said absorber;

(C) boiling weak absorbent solution formed in said absorber in said generator to concentrate said absorbent solution and to form vapor;

(D) condensing refrigerant vapor formed in said generator in said condenser;

(E) passing liquid residue discharged from said evaporator to a liquid reservoir prior to passage of said residue to said absorber; and (F) passing a substantially fixed quantity of liquid residue from said reservoir into said system for circulation therein.

7. In a method of operating an absorption refrigeration system having an absorber, an evaporator, a generator, a condenser, the steps comprising:

(A) evaporating refrigerant in said evaporator to provide cooling;

(B) absorbing refrigerant vapor formed in said evaporator in absorbent solution in said absorber;

(C) boiling weak absorbent solution formed in said absorber in said generator to concentrate said absorbent solution and to form vapor;

(D) condensing refrigerant vapor formed in said generator in said condenser;

(E) collecting the entire quantity of liquid residue discharged from said evaporator in a reservoir prior to passage of said residue to said absorber; and (F) continually passing a predetermined, substantially fixed quantity of residue from said reservoir to said absorber for circulation in said system during operation thereof so as to automatically adjust the quantity of refrigerant circulating in said system to compensate for various conditions of operation thereof.

References Cited by the Examiner

UNITED STATES PATENTS

| | | | |
|---|---|---|---|
| 3,138,938 | 6/1964 | Beardslee | 62—488 X |
| 3,141,307 | 7/1964 | Beardslee | 62—141 |

LLOYD L. KING, *Primary Examiner.*